United States Patent [19]

Querry et al.

[11] 3,906,380

[45] Sept. 16, 1975

[54] PHASE DEMODULATOR WITH PHASE SHIFTED REFERENCE CARRIER

[75] Inventors: Lester R. Querry, Laurel; Richard L. Stuart, Beltsville, both of Md.

[73] Assignee: Rixon, Inc., Silver Spring, Md.

[22] Filed: Apr. 16, 1974

[21] Appl. No.: 461,427

[52] U.S. Cl. ................ 329/122; 321/320; 321/346; 331/23; 329/104

[51] Int. Cl.$^2$ ..................... H04L 27/22; H03D 3/24

[58] Field of Search .................... 329/104, 122–125; 331/23, 25; 325/346, 419, 320

[56] References Cited

UNITED STATES PATENTS

| | | | |
|---|---|---|---|
| 3,163,823 | 12/1964 | Kellis et al. | 331/23 X |
| 3,319,178 | 5/1967 | Broadhead | 331/25 X |

*Primary Examiner*—Alfred L. Brody

*Attorney, Agent, or Firm*—Larson, Taylor and Hinds

[57] ABSTRACT

A phase-locked demodulator for demodulating a phase-difference modulated carrier having a repeated phase offset increment introduced therein. The demodulator includes, in common with conventional phase locked demodulators, a mixer having a first input connected to receive the modulated carrier and a reference carrier generator such as a VCO connected in a phase-locked feedback loop forming the second input to the mixer. In order to reduce the number of output levels, the reference carrier is phase shifted with a phase offset increment equal to the phase offset increment introduced into the modulated carrier to cancel the latter and thereby leaving only the phase changes containing data information.

10 Claims, 15 Drawing Figures

PHASE DEMODULATOR WITH PHASE SHIFTED REFERENCE CARRIER

FIELD OF THE INVENTION

The present invention relates to phase demodulators and, more particularly, to a phase-locked demodulator utilizing a shifted reference carrier.

BACKGROUND OF THE INVENTION

Conventional coherent phase demodulators employ a locally generated fixed reference carrier which is phase locked to the signal carrier. The output of the demodulator is proportional to the cosine of the phase difference between the modulated signal carrier and the reference carrier. Thus, when receiving a modulated carrier having phasors A and B at 0° and 180°, respectively, the output of the modulator consists of two levels, viz., a first level equal to cos 0° and a second level equal to cos 180°.

In phase difference modulated carrier systems employing a repeated phase offset, phase incrementing is utilized to provide clocking information. As is described in more detail hereinbelow, in systems of this type having two phase states for data and employing a repeated phase offset of 45° for each baud interval, the demodulator will see eight different absolute phasors or phase states and will produce five output levels. Similarly, for a modulation system of this type having two phase states and a repeated phase change of 30° for each baud interval, the demodulator will see twelve different absolute phase states and a minimum of six output states will be provided for decoding.

SUMMARY OF THE INVENTION

In accordance with the present invention, in a modulation system such as described, repeated phase shifts are introduced in the reference carrier which track the known repeated phase shifts in the modulated carrier so that the effect of the repeated phase shifts on data information is cancelled. Stated somewhat differently, the repeated phase changes introduced by the modulator for the purpose of providing clock information are cancelled in the demodulator, leaving only the phase changes containing data information. As a result, the number of output states to be decoded is reduced and the noise performance of the receiver improved. More specifically, considering the two examples referred to above, adapting the invention to a modulation system having two phase states and repeated phase change of 45°, whereby repeated 45° phase shifts are introduced in the receiver, the output states are reduced to two thereby simplifying the decoding process and improving noise performance by 3db. Similar results are obtained with a modulation system having two phase states for data and a repeated phase change of 30° for each baud interval, the minimum of six output states being reduced to two. Decoding in this instance can be performed by simply slicing the output levels about the midpoint (0*v*) as opposed to employing level comparators for each of the six levels as required in the prior art.

According to a preferred embodiment of the invention, a demodulator for demodulating a phase-difference modulated carrier having a repeated phase offset increment introduced therein is provided which demodulator includes a mixer having a first input connected to receive the modulated carrier, means for generating a reference carrier and means for phase shifting the reference carrier with a repeated phase offset equal to offset increment introduced into the modulated carrier, the output of the latter forming the second input to the mixer. The generating means preferably comprises a voltage controlled oscillator connected in a phase-locked loop so that the oscillator frequency is controlled by the filtered output of the mixer.

Either advance or retard offset increments can be provided and preferred embodiments of the circuitry for each are discussed hereinbelow.

Additional features and advantages of the invention will be set forth in, or apparent from, the detailed description of preferred embodiments of the invention found below.

DESCRIPTION OF THE PREFERRED EMBODIMENTS

Figure 1:
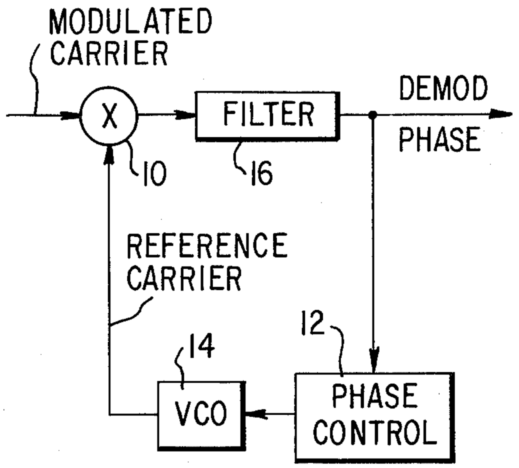
FIG. 1 PRIOR ART
FIG. 1 is a block diagram of a conventional phase-locked demodulator.

Referring to FIG. 1, a conventional coherent phase demodulator is shown which includes a product modulator 10 which is connected to receive the modulated carrier as well as a reference carrier generated in a feedback loop which includes a phase control network 12 and a variable frequency, voltage-controlled oscillator 14. The output of modulator 10 is connected to a filter 16 whose output constitutes the demodulated phase signal. As shown, the output of filter 16 is also connected to phase control network 12. Demodulators such as shown in FIG. 1 employ the locally generated fixed reference carrier, produced by the feedback loop and phase locked to the signal carrier, to provide demodulation. The output of the demodulator, i.e., the output of filter 16, is equivalent to the cosine of the phase difference between the modulated signal carrier and the reference carrier.

Figure 2:
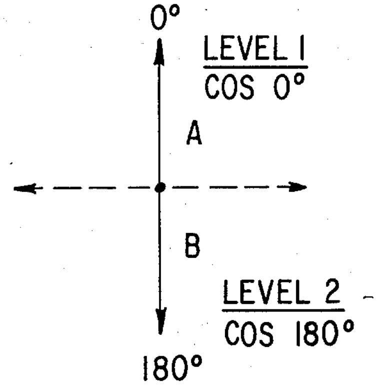
FIG. 2 PRIOR ART
FIGS. 2 to 4 are phasor diagrams used in explaining the operation of prior art phase demodulators.
Figure 3:
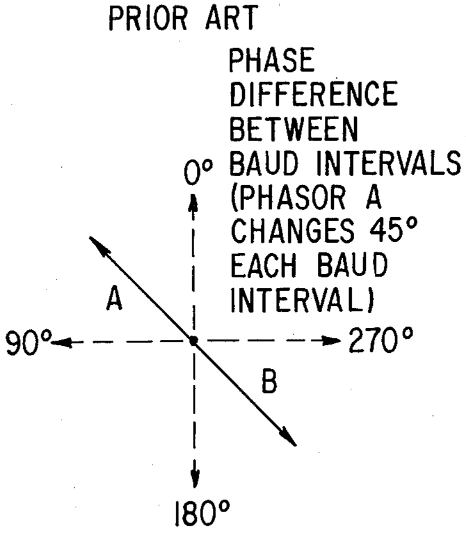
FIG. 3 PRIOR ART
Figure 4:
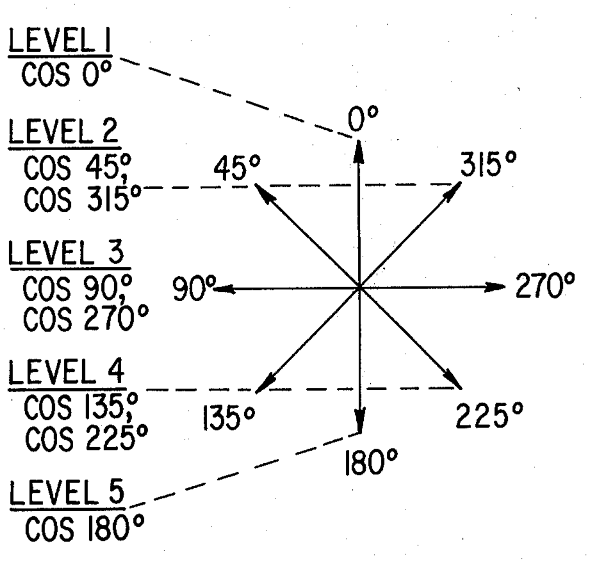
FIG. 4 PRIOR ART

When a demodulator such as shown in FIG. 1 receives a modulated carrier having phasors A and B as illustrated in FIG. 2, the demodulated output consists of two levels, viz, a first level (level 1) equal to cos 0° and a second level (level 2) equal to cos 180°. With systems receiving a phase-difference modulated carrier with a repeated phase offset, the demodulator will see a plurality of different absolute phasors and will produce a corresponding number of outputs, depending on the repeated phase offset. For example, where the phase angle of phasor A is incremented by 45° for each baud interval, i.e., where the repeated phase interval is 45°, as shown in FIG. 3, the demodulator will see eight absolute phasors and five output levels (see FIG. 4).

Figure 5:
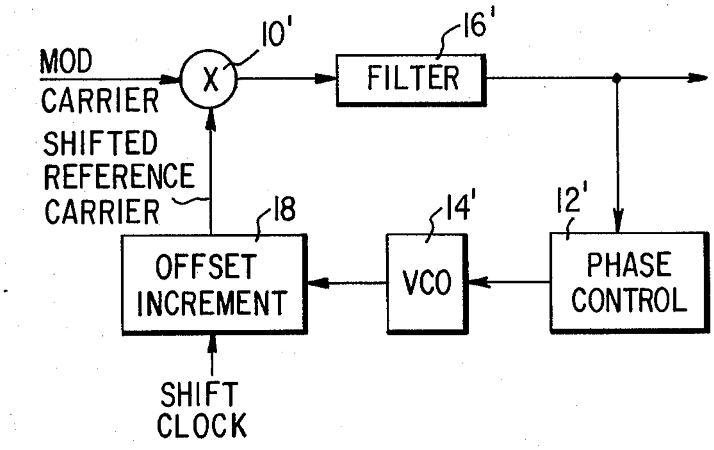
FIG. 5 is a block diagram of phase-locked demodulator with a shifted reference carrier in accordance with the invention.
Figure 6:
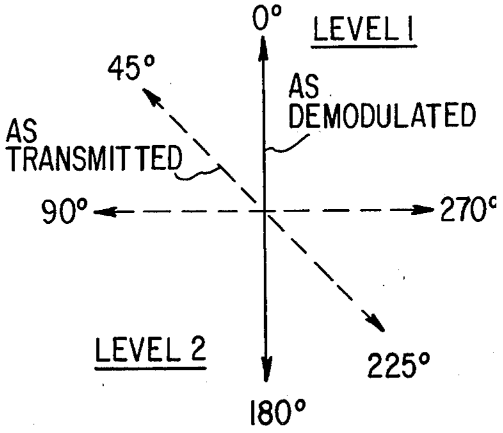
FIG. 6 is a phasor diagram used in explaining the operation of the demodulator of FIG. 5.

As discussed above, an important feature of the present invention concerns shifting the reference carrier with a repeated phase offset increment equal to the known phase offset increment introduced into the modulator, to thereby cancel the offset in the modulated carrier. To this end, a demodulator is provided such as shown in FIG. 5 wherein elements similar to those shown in FIG. 1 have been given the same numbers with primes attached. The demodulator of FIG. 5 is the same as that of FIG. 1 apart from the provision therein of an offset increment circuit 18 which, under the control of a shift clock, provides a repeated phase offset equal to that introduced into the modulator, hence cancelling the modulated carrier offset and reducing the number of demodulator output levels to two as shown in FIG. 6. It will be appreciated that by reducing the number of demodulator output levels from five to two substantially simplifies the phase difference measurement.

Figure 7:
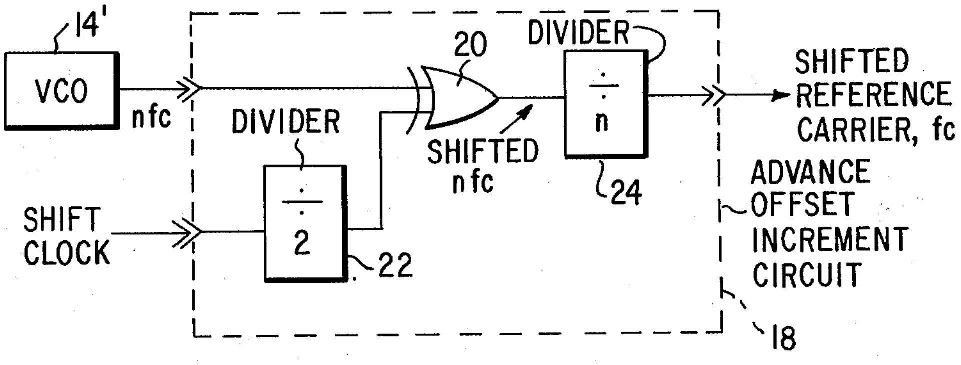
FIG. 7 is a schematic circuit diagram of one form of the phase offset increment circuit of FIG. 5.
Figures 8A, 8B, 8C, 8D:
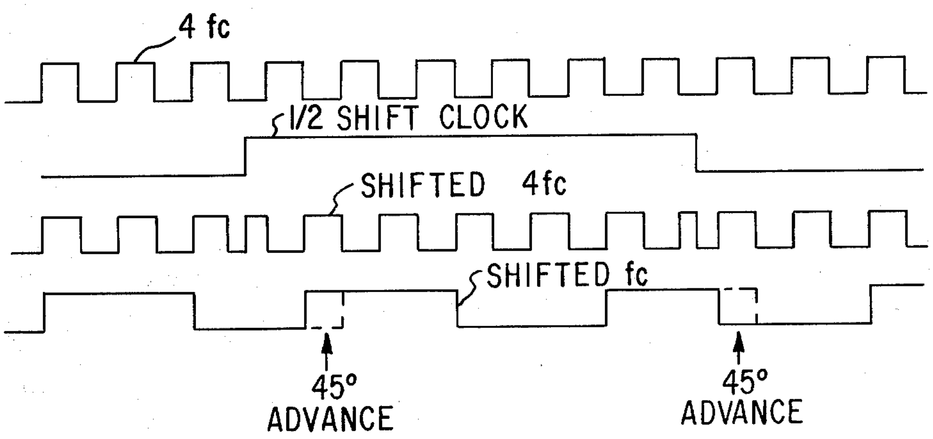
FIGS. 8(a) to 8(d) are waveforms used in explaining the operation of the circuit of FIG. 7.

Referring to FIG. 7, one preferred form of implementing the offset increment circuit 18 of FIG. 5 is illustrated. In this embodiment, an advance increment is provided and the circuit includes an exclusive-OR gate 20 which has a first input connected to the "*nfc*" output of VCO 14' and a second input connected to the output of a shift clock (not shown) through a divider network 22 which, as illustrated, divides the shift clock frequency by 2. A divide by "*n*" divider network 24 is connected to the output of exclusive-OR gate 20. The amount of phase offset increment equals $360/2n°$ and for a 45° increment $n = 4$. The timing waveforms for a 45° increment are illustrated in FIGS. 8(*a*) to 8(*d*). FIGS. 8(*a*) and 8(*b*) illustrate the inputs to exclusive-OR gate 20, viz, the 4*fc* input from VCO 14' and the one-half shift clock input from divider 22. The shifted 4fc output of exclusive-OR gate 20 is shown in FIG. 8(*c*) wherein, as illustrated, pulses are "added" so that the output of divide by 4 divider 24 is advanced by 45° as illustrated in FIG. 8(*d*). The advance circuit 18 of FIG. 7 thus adds one-half cycle to the VCO clock for each shift clock cycle, thereby advancing the phase.

Figure 9:
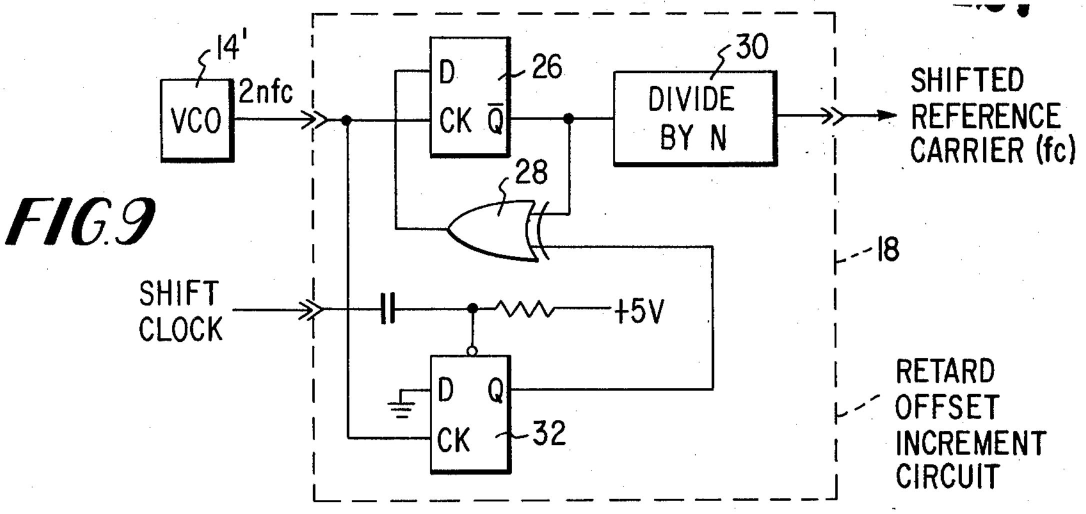
FIG. 9 is a schematic circuit diagram of another form of the phase offset increment circuit of FIG. 5.

Referring to FIG. 9, there is illustrated a further preferred form of the offset increment circuit 18 of FIG. 5, the circuit of FIG. 9 providing retarding of the phase of the VCO input frequency. As illustrated, the circuit includes a first flip-flop 26 having the clock input thereof connected to the output of VCO 14', the D or data input connected to the output of an exclusive-OR gate 28 and the Q output connected to an input of exclusive OR gate 28 and to a divide by n divider network 30. The output of the VCO 14' is also connected to the clock input of a second flip-flop 32 which is reset by the shift clock. The Q output of flip-flop 32 forms the second input to exclusive-OR gate 28 and the output of divider 30 is the shifted reference carrier. Again the amount of phase offset equals $360/2n°$ and the retard circuit of FIG. 9 acts to delete one cycle of the VCO frequency for each shift clock cycle, thus retarding the phase.

Figure 10:
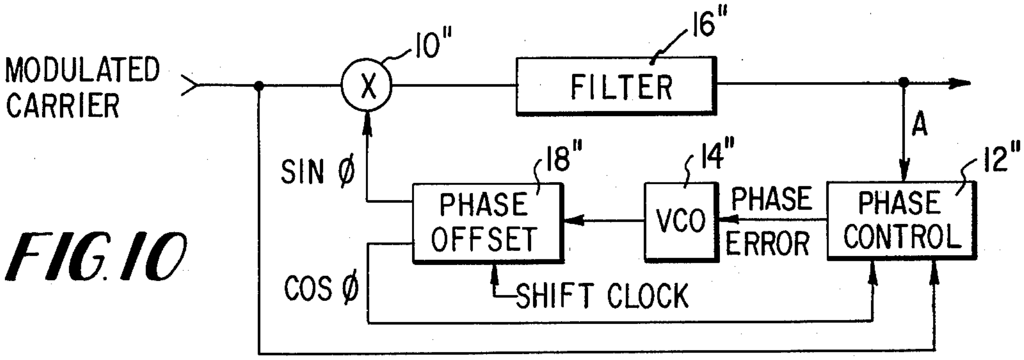
FIG. 10 is a block diagram of an alternate embodiment of the demodulator of FIG. 5.
Figure 11:
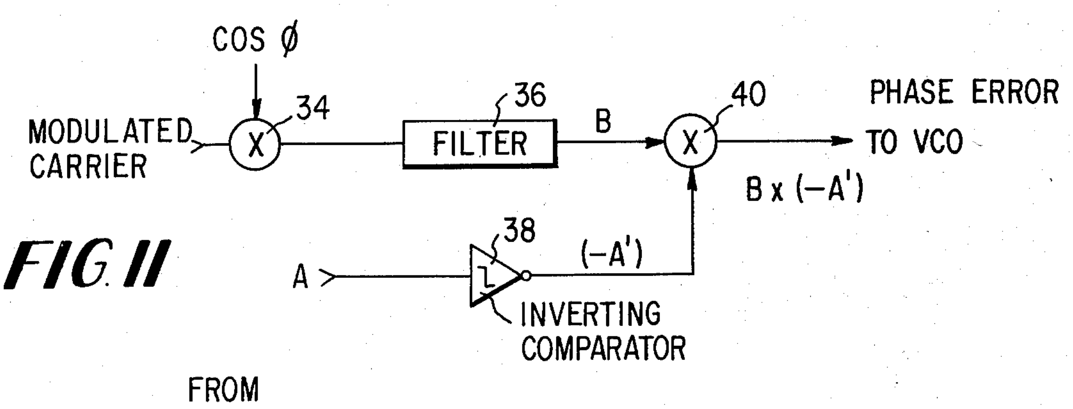
FIG. 11 is a schematic circuit diagram of a preferred embodiment of the phase shift network of FIG. 10.

Although the phase control network 12' of FIG. 5 could be implemented, the simplified demodulator embodiment of FIG. 5 was considered for illustrative purposes and a more practical embodiment of the modulator would be that shown in FIG. 10 wherein similar elements have been given the same numerals with double primes attached. As illustrated, both the cos $\phi$ output of phase offset circuit 18'' and the modulated carrier are connected as control inputs to phase control network 12''. A preferred embodiment of the phase control network is shown in FIG. 11 and includes a first mixer 34 connected to the cos $\phi$ and modulated carrier inputs, a filter 36 which is connected to the output of mixer 34 and which produces an output B. An inverting slicer 38, connected to input A, i.e., the output of filter 16'', produces an output (—A') which forms one input to a second mixer 40. The output B of filter 36 forms the second input to mixer 40, and hence the output of mixer 40, which is the phase error input signal to VCO 14'', is B*x*(—A'').

Figure 12:
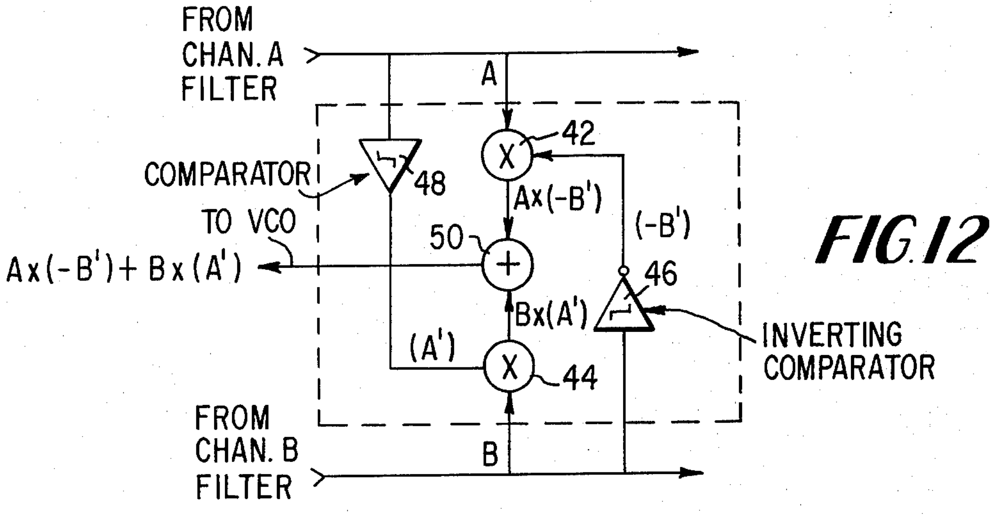
FIG. 12 is a schematic circuit diagram of a preferred embodiment of the phase shift network for a dual channel demodulator.

It is noted that for the sake of simplicity the demodulator shown in FIGS. 5 and 10 is a single channel demodulator. A two-channel demodulator would normally be employed with which include a further mixer and filter. The modulated carrier would be connected to both mixers, the sin $\phi$ and cos $\phi$ outputs of the phase offset circuit respectively forming the second inputs. In this embodiment, the phase control network receives inputs from both channels and can be implemented as illustrated in FIG. 12. As shown, first and second mixers 42 and 44 are provided which have a first input connected to the respective channel filter outputs. The second input to mixer 42 is formed by the (—B') output of an inverting comparator or slicer 46 connected to the channel B filter output while the second input to mixer 44 is formed by the (A') output of a comparator 48 connected to the channel A filter output. The A*x*(—B') output of mixer 42 and the B*x*(A') output of mixer 44 are added by an adder 50 to form an A*x*(—B') + B*x*(A') input to the common VCO (not shown) connected in the feedback path.

It will be appreciated that the invention is also applicable to higher order system and, for example, the eight phasors of a four phase difference modulation system with a repeated phase increment could be reduced to four phasors thereby.

Although the present invention has been described relative to exemplary embodiments thereof, it will be understood by those skilled in the art that variations and modifications can be effected in these embodiments without departing from the scope and spirit of the invention.

We claim:

1. A method of demodulating a phase-difference modulated carrier with a repeated phase offset increment, said method comprising the steps of generating a reference carrier, shifting the reference carrier with a repeated phase offset equal to the offset increment introduced into the modulated carrier so as to produce a phase offset reference carrier, and applying the received modulated carrier to one input of a mixer and applying the phase offset shifted reference carrier to a second input of said mixer to produce a demodulated phase signal.

2. A method as claimed in claim 1 wherein the step of generating said reference carrier comprises using a voltage controlled oscillator to generate a reference carrier frequency and feeding back the demodulated phase signal to control the frequency generated by the voltage controlled oscillator.

3. A demodulator for demodulating a phase-difference modulated carrier having a repeated phase offset increment introduced therein, said demodulator comprising a mixer having a first input connected to receive the modulated carrier, means for generating a reference carrier, means for shifting the phase of said reference carrier with a repeated phase offset equal to the offset increment introduced into the modulated carrier, and means for connecting the output of said phase shifting means to a second input of said mixer.

4. A demodulator as claimed in claim 3 wherein phase shifting means comprising a phase incrementing circuit controlled by a shift clock.

5. A demodulator as claimed in claim 3 wherein said reference frequency generating means comprises a variable frequency oscillator connected in a phase-locked loop so that the output frequency of said oscillator is controlled by the output of said mixer.

6. A demodulator as claimed in claim 5 wherein a filter is connected to the output of said mixer and said phase locked loop includes a phase control network connected to the output of said filter and to the input of said variable frequency oscillator.

7. A demodulator as claimed in claim 6 wherein said phase shifting means comprises means for advancing the phase of said reference carrier.

8. A demodulator as claimed in claim 6 wherein said phase shifting means comprises means for retarding the phase of said reference carrier.

9. A demodulator as claimed in claim 7 wherein said phase shifting means includes an exclusive -OR gate having a first input connected to the output of said variable frequency oscillator and a second input connected to a shift clock input through a divide by two divider, and a divide by *n* divider connected to the output of said exclusive -OR gate, where the amount of phase offset increment equals **360/2*n*°**.

10. A demodulator as claimed in claim 8 wherein said phase shifting means comprises an exclusive -OR gate; a first flip-flop having a clock input connected to the output of said variable frequency oscillator, a second input connected to the output of said exclusive -OR gate and an output connected to a first input of said exclusive -OR gate; a second flip-flop having a clock input connected to the output of said variable frequency oscillator, a reset input connected to a shift clock signal, and an output connected to a second input of said exclusive-OR gate; and a divide by n divider connected to said output of said first flip-flop, where the offset phase increment equals **360/2*n*°**.

* * * * *